Aug. 26, 1969     I. E. NUTTER ET AL     3,463,464
FLUID CONTACT TRAY

Filed Sept. 26, 1967     2 Sheets-Sheet 1

INVENTORS
IRVIN EARL NUTTER
BY DALE E. NUTTER
Browne, Schuyler & Beveridge
ATTORNEYS Aug. 26, 1969   I. E. NUTTER ET AL   3,463,464
FLUID CONTACT TRAY Filed Sept. 26, 1967   2 Sheets-Sheet 2

INVENTORS
IRVIN EARL NUTTER
BY DALE E. NUTTER
Bowen, Schuyler & Beveridge
ATTORNEYS 3,463,464
FLUID CONTACT TRAY
Irvin E. Nutter, 3847 S. 88 East Ave. 74145, and Dale
E. Nutter, 1512 S. 77 East Ave. 74112, both of Tulsa,
Okla.
Continuation-in-part of application Ser. No. 360,494,
Apr. 17, 1964. This application Sept. 26, 1967, Ser.
No. 670,681
Int. Cl. B01d 3/24
U.S. Cl. 261—114                 10 Claims

ABSTRACT OF THE DISCLOSURE

A fluid contact tray having a plurality of tapering apertures therein, the major dimension of the apertures lying in the direction of liquid flow across the tray. A deflector is supported above each aperture by a pair of transversely extending baffles one at each end of each aperture.

---

This is a continuation-in-part of our copending application Ser. No. 360,494, now abandoned, filed Apr. 17, 1964.

A specific environment for this invention is in fractionation columns commonly referred to as bubble towers used predominantly in the petroleum and chemical industries for the distillation and separation of hydrocarbon and chemical materials and also for washing gases and producing chemical reactions. Such columns contain vertically spaced, apertured trays which are adapted to support a traversing liquid. Ascending vapors are directed upwardly through apertures formed in the trays so that they will come into contact with the transcending liquid. At the discharge end of each tray it is usual practice to provide a weir over which liquid may flow into a downcomer where it will be directed to the inlet or upstream side of the next adjacent lower tray. This type of apparatus causes the liquid to follow a descending somewhat sinuous path across the vertically spaced trays as the ascending gases flow upwardly through the tray apertures.

Of course, an important consideration in the design of apparatus for this use is that the liquid must be prevented from passing downwardly through the vapor-introducing apertures formed in the trays. Avoidance of the undesired flow through the tray apertures has been accomplished in the past by the use of well known bubble cap trays or in more recent years either by utilizing small directional openings in the tray or by providing a pressure responsive valve to control the flow of fluid through each aperture. Pressure responsive valve type trays and trays without valves have been designed in which several of the apertures are associated with an overlying deflector or cover secured to the tray only at the upstream end of the aperture. While such a deflector deters the flow of descending liquid into the aperture, this arrangement has the undesirable effect of directing the ascending vapors in a direction aligned with the direction of liquid flow. The ascending vapors thus jet the liquid in a downstream direction over the liquid exit weir and reduce the time during which the liquid remains on a tray.

Other trays known as sieve trays do not have deflectors associated with any of the apertures and result in a tendency for the upflowing gases to be directed toward the liquid exit edge of tray due to the liquid velocity across the tray. Another disadvantage of conventional sieve type trays, which comprise flat tray decks with a specific pattern of circular apertures, is the tendency for the liquid to flow downwardly through the apertures concurrently with the upward flow of vapors at moderate to low fluid flow, resulting in poor efficiency of the apparatus. Still another disadvantage of conventional sieve tray construction is that, if apertures (vapor-discharging openings) are relatively small, they may become clogged when fluids being processed form or deposit a residue on the tray.

The previous use of pressure responsive valves which overlie each aperture also is subject to certain recognized disadvantages. As in all apparatus involving moving parts, there are manufacturing difficulties which result both from the requirement of accurate dimensional tolerances and the necessity for a plurality of separately manufactured parts. Moreover, the existence of moving parts presents problems in the operation of apparatus employing such valves. The presence of residue forming or depositing fluids often causes valves to stick. When corrosive fluids are used, the valve and the marginal areas of the tray at the apertures become corroded. As the valves moves, these corroded surfaces rapidly wear away to expose virgin metals to the corrosive fluids, causing accelerated corrosion and wear operation. Additionally the use of movable valves in a tray limits to some extent the total bubbling area of the vapor-discharging openings formed in the tray and directly limits the vapor capacity of the tray. This is because the perimeter of each tray contains a marginal area which overlaps an adjoining tray supporting structure. A movable valve cannot be placed too closely to the peripheral edge or the valve movement would be arrested by the presence of the supporting structure.

The present invention seeks to avoid the aforementioned difficulties by providing a fluid contacting apparatus with a tray having a plurality of apertures which are longitudinally tapered from a maximum transverse dimension at its upstream end to a minimum transverse dimension at its downstream end. Struck upwardly from the tray plate and overlying each of the apertures is an associated fluid deflector member corresponding in shape and alignment to the underlying aperture. The deflector is connected to the tray plate at its upstream and downstream terminal ends by baffle portions which extend above the tray plate.

Preferably, each of the apertures is in the shape of an isoceles trapezoid which has its axis of symmetry aligned with the direction of liquid flow with its larger parallel end located at its upstream edge. It is also preferred that each of the fluid deflector members and respective baffles are struck from the tray.

Such a tray is particularly advantageous because it deters the liquid from dumping or passing through the tray apertures, as compared to sieve trays, over a wide range of vapor differential pressures, liquid depths and flow rates. These trays may also be constructed with openings of substantial area which are capable of sustaining a high vapor flow capacity with any accompanying liquid flow rate. The openings are aligned to direct the vapors transversely with respect to the directional flow of the liquid and thus the tendency of liquid to flow downwardly through the apertures is substantially reduced. By this orientation, the vapor neither tends to oppose the flow of liquid nor urge the liquid in a direction toward or away from the overflow weir.

Another important feature of this invention is the absence of any movable parts, and thus it is not subject to either the initial cost or maintenance expense of valves. This construction also permits a maximum number of vapor-passing apertures in the tray since the apertures may be located in close proximity to the peripheral edges of the tray. The particular orientation and shape of the apertures permit them generally to have a larger area per unit than the sieve tray apertures without permitting fluid to pass downwardly through the vapor passages.

From the foregoing, it will be apparent that the objects of this invention are to provide an improved fluid contacting apparatus which is relatively simple to manufacture and maintain, reliable in operation, and capable of achieving a most efficient and intimate contact of vapor with a liquid while preventing the passage of liquid downwardly through the tray apertures over a greater operating range than sieve trays now used extensively by industry. The accompanying drawings illustrate but one of numerous variations of this apparatus.

Figure 1:
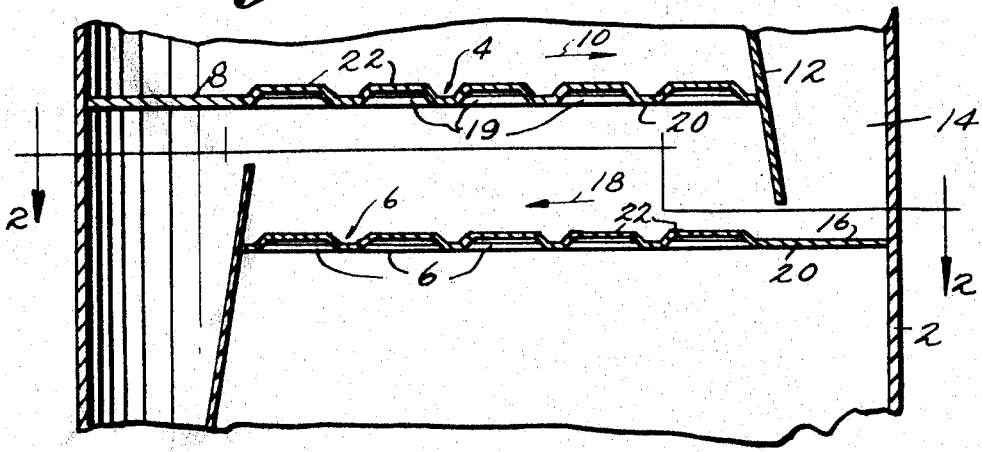
FIGURE 1 is a partial vertical sectional view taken through a liquid-vapor contact column which incorporates fluid contact trays of this invention.

In the vapor-liquid contact tower illustrated partially in FIG. 1, it will be noted that the overall apparatus is of conventional construction involving a cylindrical housing 2 and a plurality of horizontal fluid contact trays 4 and 6 which are vertically separated in spaced relation. Tray 4 has an upstream portion 8 for receiving the liquid to be processed. Liquid flows across the tray 4 in the direction represented by arrow 10 to a downstream location on the tray adjacent the overflow weir 12. Liquid then passes over the weir 12 and descends through the downcomer conduit 14 onto the upstream end 16 of the lower fluid contact tray 6. From there, the liquid continues its movement in a downstream direction indicated by arrow 18 toward another overflow weir and a related downcomer conduit. As the liquid travels across a plurality of trays, such as 4 and 6 and through a series of downcomer conduits, its path is generally sinuous in a vertical plane.

While the liquid passes across the fluid contact trays 4 and 6, it is subjected to an upwardly flowing vapor stream which ascends through apertures formed in the trays. The lower surface of each fluid deflector above each aperture partially defines a vapor chamber for the upwardly flowing body of vapor.

As mentioned in the introductory comments, it is important in apparatus of this type that the liquid be prevented from flowing downwardly through the apertures formed in the trays. This invention relates to the shape of the apertures and to the related overlying fluid deflectors and baffling members which are positioned to deter the flow of liquid through the tray apertures in a simple and convenient manner.

Figure 3:
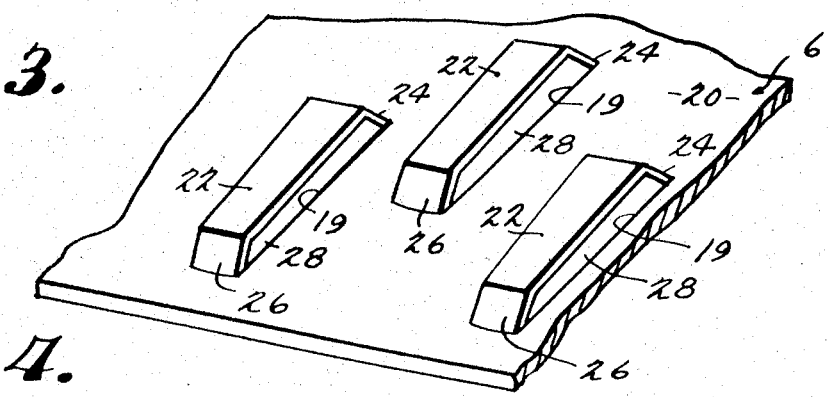
FIGURE 3 is a perspective view of a portion of one of the fluid contact trays of this invention, showing the novel shape and construction of the apertures with their associated fluid deflector members and baffle portions.
Figure 4:
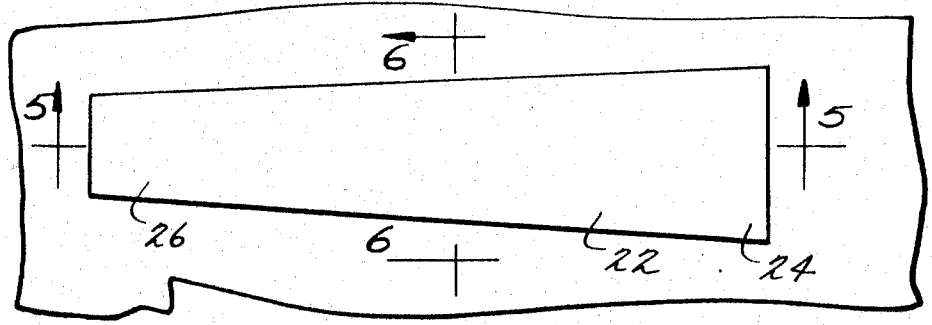
FIGURE 4 is a plan view of a portion of the fluid contact tray showing a single fluid deflector member and its end baffle portions.

In the illustrated embodiment, each of the apertures 19 (FIG. 3) is formed in the shape of an isoceles trapezoid having its greatest dimension, its major axis and its axis of symmetry 5—5 (FIG. 4) axially aligned with the direction of liquid flow 18 (FIG. 2) across the tray. Directly above each of the apertures 19 there is a fluid deflector member 22 which has baffle portions 24 and 26 (FIG. 5) and which is substantially geometrically identical in the plan view to its corresponding aperture 19. Each of the deflector members 22 with its baffle portions 24 and 26 have been struck upwardly from the tray plate 20 in a manner so that it remains as an integral portion thereof. The major transverse dimension of each aperture (i.e., that dimension measured transverse to the flow direction 18 or parallel to the line 6—6 in FIG. 4), is located at its upstream end, and its transverse dimensions are tapered to diminish in a downstream direction throughout the full length of the aperture from a maximum transverse dimension at its upstream edge to minimum transverse dimension at its downstream edge. The gradual tapered construction of the trapezoidal shape illustrated in FIG. 4 is preferred, but an intermittently reduced transverse dimension or a constant transverse dimension also may be used.

Figure 2:
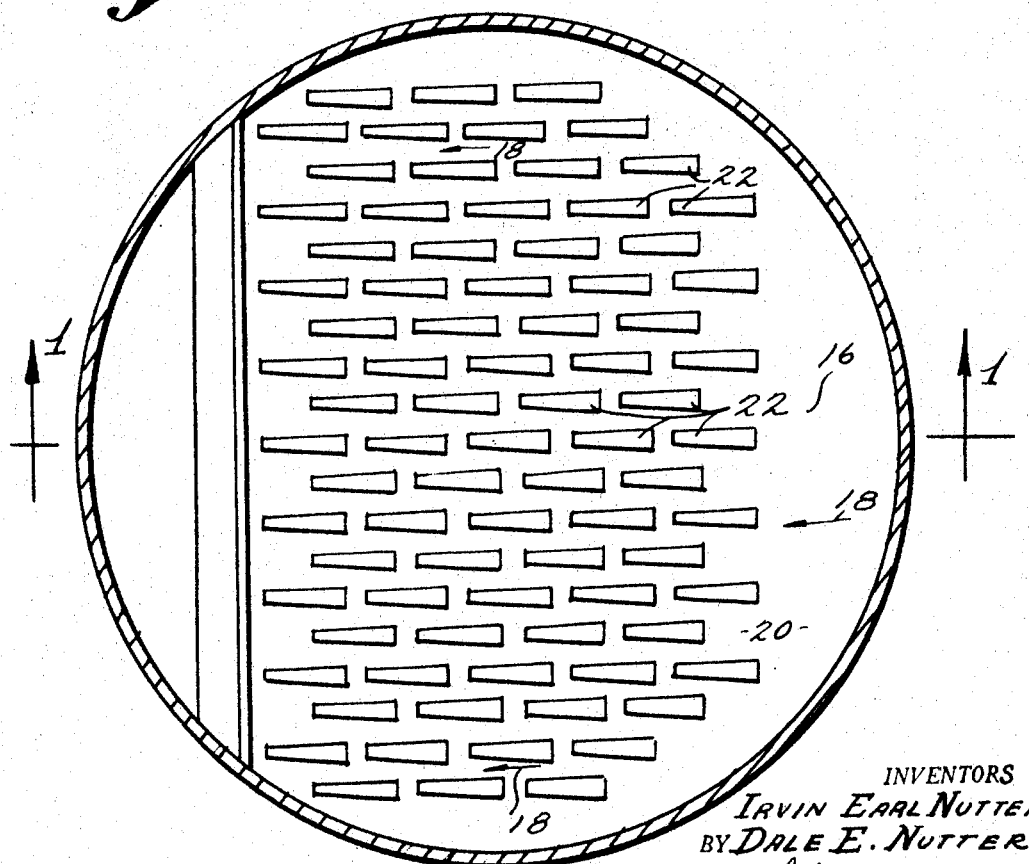
FIGURE 2 is a plan view of one of the fluid contact trays as seen along the line 2—2 in FIG. 1.
Figure 5:
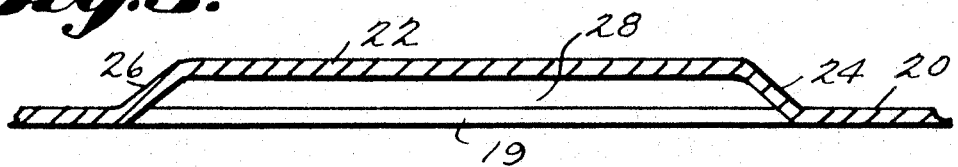
FIGURE 5 is a longitudinal sectional view taken along the line 5—5 in FIGURE 4 showing an aperture and one of the vapor flow openings beneath the associated fluid deflector member.

Turning to FIG. 5, it will be seen that the deflector member 22 has its major axis oriented parallel to the direction of liquid flow 18 (FIG. 2) and its has an upstream baffle portion 24 which is inclined upwardly from the tray plate 20 to form an obtuse angle with the wide end of the cover member. A similar but oppositely oriented baffle portion 26 is provided at the narrow downstream terminal end of the cover member. The upstream baffle portion 24 lies across the entire maximum transverse extent of the aperture so that the entirety of the diminishing width aperture is shielded from the directly approaching liquid flowing in the direction indicated by arrow 18 (FIG. 2). The baffle portions 24 and 26 are sloped with curved ends which merge in offset position with the surfaces of the tray plate 20 and the ends of deflector member 22. (FIG. 5) in order to permit a streamlined flow of the liquid over the tray plate 20 with a minimum of turbulence.

Figure 6:
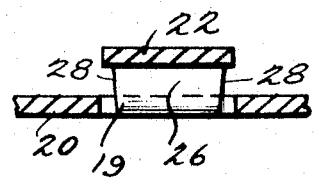
FIGURE 6 is a transverse sectional view taken along the line 6—6 in FIG. 4 looking in a downstream direction.

The effect of the combined aperture and deflector member on the flow of ascending vapors will be appreciated by an inspection of FIG. 6 which shows that the deflector or cover member 22 and the tray plate 20 define together a pair of oppositely-directed openings 28 which are aligned laterally to the member 22 and generally transversely to the liquid flow direction 18. Thus, vapor passing upwardly through the aperture 19 is directed outwardly through the openings 28 into the overlying body of liquid at an inclination to the tray plate 20 and at substantially right angles to the liquid flow direction.

By limiting the directional effect of the vapors passing through the tray, there is a minimum disturbance of the liquid flow rate across tray 20. The presence of the upstream baffle 24 and the downstream baffle 26 prevent the vapors from excessively impelling the liquid in either an upstream or downstream direction. The shape and orientation of the aperture 19 and their respective deflector members 22 with the baffle portions 24 and 26 are also important because they prevent liquid from passing downwardly through the tray. This is true largely because each upstream baffle portion 24 lies across the upstream end of its respective aperture 19. It is apparent from an inspection of FIG. 4 that the liquid which strikes the baffle 24 is deflected either above or to the sides of the aperture. As the liquid deflected to the sides continues its path in a downstream direction, it has a tendency to return inwardly toward the openings 28. However, the declining dimensions of the deflector member 22 and aperture 19, combined with the effect of the issuing vapor and the width of the upstream baffle 24 in relation to the reduced width of terminal baffle 26 tends to prevent the liquid from entering openings 28 which are symmetrically aligned away from the direction of liquid flow along the sides of aperture 19.

Figure 7:
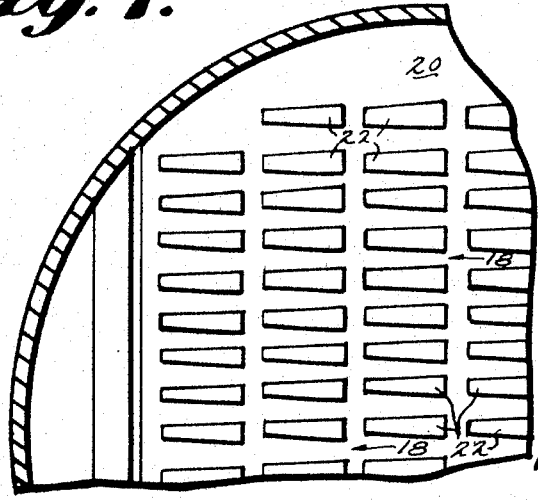
FIGURE 7 illustrates a portion of a tray in which the apertures of the rows are in aligned directly adjacent relationship.

The relative disposition of the apertures on a tray may vary from the staggered row-to-row arrangement illustrated in FIG. 2 to the adjacent row-to-row arrangement shown in FIG. 7. In both the FIG. 2 and FIG. 7 embodiments, the flow direction is in longitudinal direction throughout the extent of the tray so that all flow paths are substantially parallel, as opposed to those types of apparatus in which the liquid flows radially in diverging or converging paths. The flow pattern illustrated in FIGS. 2 and 7, which is preferred, but not essential to the utilization of this invention results in a uniform liquid flow velocity and a substantially equal contact between all increments of liquid and vapor passing through the apparatus.

This specification illustrates only one preferred shape of the opening 19 and of the deflector member 22. Other shapes either rectangular or having other isosceles trapezoidal configurations may be adopted within the spirit of this invention.

Also within this invention, trays may be constructed to include overlapping groups and random arrangements of conventional pressure responsive valves and covered apertures such as those illustrated in this specification. In some instances, valves and their associated apertures may be of a tapered shape to provide the advantageous characteristics of the invention.

We claim:

1. A fluid contact tray for supporting a body of liquid moving thereacross from an upstream location to a downstream location in a given longitudinal flow direction throughout the extent of the tray, comprising, a liquid conveying plate, a plurality of apertures extending through the plate, said apertures having mutually parallel major axes in the plane of the plate aligned with said longitudinal flow direction, a plurality of fluid deflector members each aligned directly above an associated aperture and rigidly interconnected to said plate by baffle members at the upstream and downstream ends of the associated aperture to define side openings which are oriented to direct vapor in a direction transverse to the longitudinal flow direction of liquid conveyed on said plate, the baffle members lying across the entire transverse extent of their associated apertures.

2. A fluid contact tray according to claim 1 in which each of said apertures has its dimensions transverse to its major axis decreasing progressively towards its downstream end.

3. A fluid contact tray according to claim 1 in which each of the apertures is in the shape of an isosceles trapezoid with its axis of symmetry and its major axis aligned with said flow direction.

4. Apparatus according to claim 1 having a plurality of said plates in combination with a housing, said plates being horizontally oriented in vertical spaced relation within said housing with the lower surface of each plate partially defining a vapor chamber, whereby vapor from the vapor chamber passes upwardly through the plate and through a body of liquid on said plate, means for introducing liquid to the upstream portion of each plate to produce a substantially uniform flow velocity of liquid throughout the extent of the corresponding plate, and downcomer conduit means communicating between a downstream portion of an upper one of said plates and an upstream portion of a lower one of said plates.

5. Apparatus according to claim 1 in which each of said baffle members is inclined to form an obtuse angle with its respective said deflector member.

6. Apparatus according to claim 1 wherein the baffles and deflector members are integral with said plate and in plan view are substantially geometrically identical to their respective underlying apertures.

7. A fluid contact tray for supporting a body of liquid moving thereacross in a given flow direction from an upstream location to a downstream location, comprising, an apertured plate having a group of apertures extending therethrough, each of said apertures being tapered throughout its major portion from a maximum dimension transverse to said flow direction in the plane of the plate at its upstream end to a minimum dimension transverse to said flow direction in the plane of the plate at its downstream end, a plurality of deflector members each overlying and aligned with a respective one of said apertures, and a plurality of upstanding baffles extending above the plate at locations immediately upstream and downstream of an aperture, said baffles extending across the transverse extent of their associated apertures, each of said baffles interconnecting said plate and its respective said deflector member, each of said deflector members and said plate defining side openings which are oriented to direct the flow of vapor which passes upwardly through the aperture in a direction generally transverse to the flow direction of liquid on the plate.

8. Apparatus according to claim 7 in which each of said baffle members is inclined to form an obtuse angle with its respective said deflector member.

9. Apparatus according to claim 7 in which each of said apertures has its major axis aligned parallel to said flow direction.

10. Apparatus according to claim 7 in which each of said deflector members and its respective said baffle member are integral with said plate and are substantially geometrically identical to the respective aperture.

References Cited

UNITED STATES PATENTS

| | | |
|---|---|---|
| 2,951,691 | 9/1960 | Nutter. |
| 2,979,316 | 4/1961 | Houston. |
| 3,019,003 | 1/1962 | Glitsch. |
| 3,022,054 | 2/1962 | Kotzeboe. |
| 3,080,155 | 3/1963 | Glitsch et al. |
| 3,087,711 | 11/1960 | Glitsch _____ 261—114 |
| 3,125,614 | 3/1964 | Mayfield et al. _____ 261—114 |
| 3,162,699 | 12/1964 | Sivyer. |
| 3,245,669 | 4/1966 | Huggins et al. |

FOREIGN PATENTS

| | | |
|---|---|---|
| 645,354 | 7/1962 | Canada. |
| 1,026,371 | 4/1966 | Great Britain. |

OTHER REFERENCES

Nutter, E. I., "Float Valve", Chemical Engr. 176–177 (May 1954).

"Nutter Float Valve Trays," Refinery Catalog (4 pp) 29th Rec. (1962).

Thirift, G. C. "Flextray," Chemical Engineering 177–178 (May 1954).

HARRY B. THORNTON, Primary Examiner

S. H. MARKOWITZ, Assistant Examiner